May 12, 1942.　　M. L. MASTELLER　　2,282,333

HYDRAULIC BRAKE

Filed Sept. 14, 1940

INVENTOR.
Malcolm L. Masteller

Patented May 12, 1942

2,282,333

UNITED STATES PATENT OFFICE 2,282,333

HYDRAULIC BRAKE

Malcolm L. Masteller, Miami, Fla.

Application September 14, 1940, Serial No. 356,808

1 Claim. (Cl. 60—54.6)

This invention relates to improvements in hydraulic braking apparatus and its objects are—
1st, to provide improved means for preventing the infiltration of air into the hydraulic system;
2nd, to provide improved means for preventing leakage from the hydraulic system, as around the compressor piston's secondary packing cup; 3d, to provide improved means for rendering the hydraulic system tight and readily operable.

I attain these objects by mechanism illustrated in the accompanying drawing which shows a diagrammatic outline of a hydraulic braking system, partly in section, embracing the invention.

Figure 1:
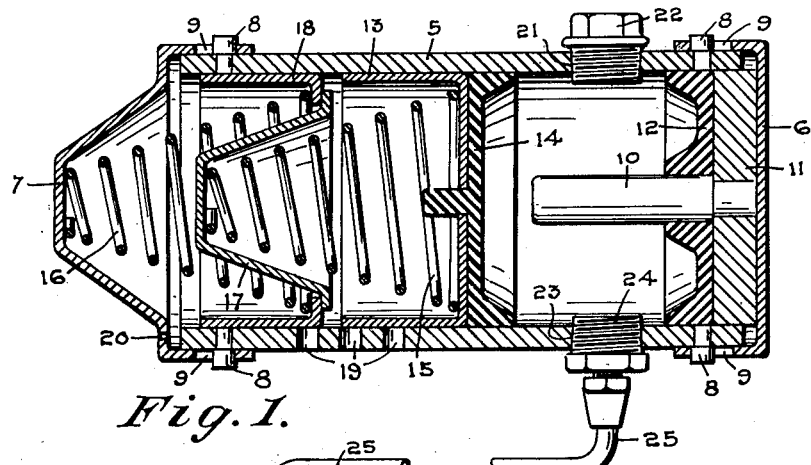
Figure 1 is a vertical longitudinal section of the supply means.

In conventional hydraulic braking systems there is a double acting check-valve positioned in the pressure line between the compressor piston and the wheel cylinders, which serves two main purposes; first—to facilitate the pumping or replenishing function; second—to hold a given pressure, usually about 7 pounds per square inch, in the wheel cylinders. The latter accomplishes three objects, 1st—to prevent the infiltration of air at the wheel cylinders; 2nd—to maintain the wheel cylinder packing cups spread snugly against the cylinder walls and in prime condition; 3d—to render the wheel cylinders tight and more readily operable. These three purposes are thereby accomplished as regards the wheel cylinders only, and air is admitted around the secondary packing cup at the rear of the compressor piston, a part of which gravitates directly to the reservoir and is eliminated, another part passes into the pressure lines and renders the braking applications spongy and ineffective. When this occurs it is necessary to "pump up" the brakes, i. e., work the pedal up and down several times, before a satisfactory braking application can be made. These strokes, in the absence of sufficient hydraulic pressure, have the effect of pumping additional liquid from the reservoir to the pressure system, which enables the moving of the brake shoes through a progressively greater range until the brake becomes effective. This must be repeated for each application while said air is present in the system.

This air intake weakness of conventional hydraulic braking systems at the rear end of the master cylinder is due to lack of pressure at this point, coupled with the movement, and can be overcome by keeping the master cylinder under the same normal pressure as the wheel cylinders.

This invention contemplates the use of a spring pressed piston reservoir, preferably of the type described herein, features of which are more fully described and claimed in Patent Number 2,188,913 dated February 6, 1940, said reservoir being designed to maintain the liquid supply under a predetermined normal pressure throughout the hydraulic system, to be self compensating in regard to the quantity of liquid stored therein and variations in its volume due to changes in temperature, and to deliver it to the high pressure lines as required.

Therefore, I do not use the double acting check-valve for the dual functions abovementioned, but only as a retarding valve to facilitate said pumping or replenishing, and by the device subject of this invention said normal pressure is made uniform throughout the hydraulic system, and of equal benefit to its various parts.

Referring to the drawing—

Figure 4:
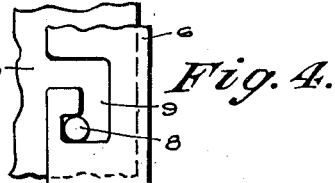
Figure 4 is a fragmentary view of a portion of the supply means and a portion of its detachable head, showing the means of attachment.

The reservoir of Figure 1 comprises casing 5, detachable heads 6—7 attached to said casing by means of pins 8 with their slots 9 as more particularly shown in Figure 4, stop member 10 pressed into packing cup backing plate 11, packing cup 12 which is of the double flange variety the outer flange engaging the wall of casing 5 and the inner flange engaging member 10, piston 13 with its packing cup 14, a resilient means made up of compression springs 15—16 and pistonlike member 17—18, the latter serving as a seat for said springs having a bearing on the wall of the casing for preventing weaving and buckling which would be inherent in a single spring of the required dimensions. Casing 5 is provided with a series of ports 19 through which the piston position can be observed, thus serving as an indicator of the quantity of available liquid in the reservoir as well as breather means for compensating the changing position of the pistons. Head 7 is also provided with breather port 20. There is also the combination filler and bleeder port 21 with its plug 22 and port 23 with its fitting 24 adapted to connect conduit 25 leading to the master cylinder.

Figure 2:
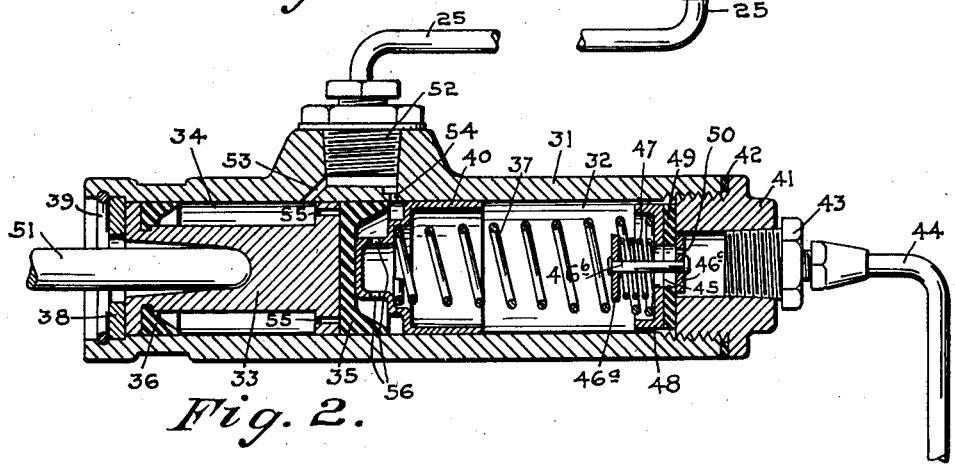
Figure 2 is a vertical longitudinal section of the master cylinder.

The master cylinder of Figure 2 comprises casing 31 housing cylindrical chamber 32, compressor piston 33 having an annular recess forming compartment 34 between said piston and the wall of said casing, with its primary packing cup 35 and secondary packing cup 36, compression spring 37 urging said piston toward end washer 38 which is held against a shoulder in said casing 31 by retaining spring 39 which in turn is held in an annular recess in casing 31 by its own resilience, spring seating member 40 having a bearing on the wall of chamber 32, positioned in advance of said piston and being slidable therewith, forward end closure member 41 with its gasket 42 and fitting 43 adapted for connecting conduit 44 leading to the brake; also a double acting check-valve (seated on said end closure member 41 and held in place by said compression spring 37) including an inner check-valve made up of passage 45, valve member 46a, 46b and 46c, and compression spring 47, permitting a free outward flow of liquid from chamber 32 and preventing its return through said passage 45, a heavier loaded outer check-valve made up of valve member 48 with its packing washer 49 seated on member 41, and compression spring 37, permitting a restricted return flow of liquid to chamber 32; and a passage 50 bypassing said check-valves; also actuating rod 51 which is conveniently attached to an operating crank and pedal not shown. The conduit 25 leading from the reservoir is attached to the master cylinder by means of fitting 52, the liquid in said conduit being associated with that in the compression chamber 32 by means of passages 53—54 in the cylinder wall, 55 through the head of piston 33 and 56 through spring seat member 40.

Figure 3:
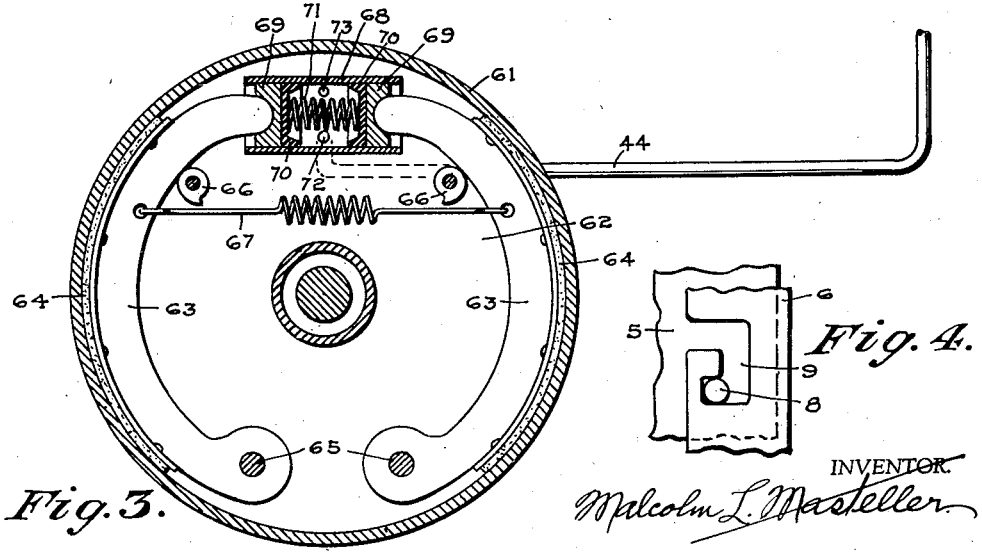
Figure 3 is a vertical section of a brake drum and of the brake actuating fluid pressure motor, showing brake shoes and allied parts.

The brake of Figure 3 comprises drum 61 affixed to the braking wheel (not shown) and disposed to revolve with it, backing plate 62 rigidly mounted in relation to said drum, a pair of brake shoes 63, with their facings 64, pivotally mounted upon said backing plate by means of anchor bolts 65, said shoes being operable into frictional engagement with said drum but normally resting on adjustable stops 66 mounted upon said backing plate, where they are drawn by extension spring 67. The fluid pressure brake actuating motor is also mounted upon said backing plate and comprises casing 68 having a cylindrical bore therein, a pair of inversely disposed pistons 69, with their packing cups 70, operating within said bore, a compression spring 71 sustaining said packing cups in position and exerting a slight outward pressure upon said pistons 69, maintaining them in position in the absence of hydraulic pressure, a threaded port 72 for attaching the conduit 44 leading from the master cylinder, and a threaded bleeder port 73 having a plug which is not shown.

To fill the reservoir with operating liquid, head 7 is removed, together with the resilient means 15—16—17—18, then plug 22, after which the piston 13 can be drawn back to "full" position. The liquid is then poured in through port 21 and the removed members replaced.

In operation the reservoir of Figure 1 maintains the liquid throughout the hydraulic system under a normal pressure of say 8 pounds per square inch when the reservoir is approximately full and 6 pounds per square inch when it is approximately empty. The displacement and pressure for applying the brake is brought about by a forward thrust of actuating rod 51 and piston 33. In case of a deficiency of displacement to produce a satisfactory braking application upon the first stroke, as due to negligence in taking up slack occasioned by wear of the shoe facings and/or a heat expanded drum, a pumping or replenishing action will, upon release, be set up, actuated by compression spring 37 which will return the piston 33 to its off brakes position faster than the liquid can return through said double acting check-valve, with the result that a depression will be set up in chamber 32 and additional liquid will be drawn from the reservoir through passages 53—55—56; if then an additional application be immediately made, said additional liquid will enable the moving of the shoes through a progressively greater range until a satisfactory application is accomplished. After the braking operation any excess of liquid in the compression chamber and wheel lines will return to the reservoir via passages 50—56—54, the entire hydraulic system returning to equilibrium.

What I claim is:

In a master cylinder comprising a casing and a chamber therein, a piston slidable in said chamber for creating pressure therein, means for actuating said piston, and a port in said casing adapted for connecting the pressure lines of a braking system; a control for the movement of liquid under pressure through said port, comprising in combination a check-valve permitting a free outward flow from said chamber, a heavier loaded check-valve permitting a restricted return flow to said chamber, and a passage bypassing said valves and permitting an eventual and normal equilibrium on both sides of said valves; substantially as described.

MALCOLM L. MASTELLER.